(12) United States Patent
Hargil et al.

(10) Patent No.: US 11,341,210 B2
(45) Date of Patent: May 24, 2022

(54) TWO-DIMENSIONAL MULTI-LAYER CONVOLUTION FOR DEEP LEARNING

(71) Applicant: Apple Inc., Cupertino, CA (US)

(72) Inventors: Asaf Hargil, Binyamina (IL); Ali Sazegari, Cupertino, CA (US)

(73) Assignee: Apple Inc.

( * ) Notice: Subject to any disclaimer, the term of this patent is extended or adjusted under 35 U.S.C. 154(b) by 435 days.

(21) Appl. No.: 16/425,868

(22) Filed: May 29, 2019

(65) Prior Publication Data

US 2020/0265106 A1 Aug. 20, 2020

Related U.S. Application Data

(60) Provisional application No. 62/806,659, filed on Feb. 15, 2019.

(51) Int. Cl.
*G06F 17/15* (2006.01)
*G06F 7/483* (2006.01)
*G06N 3/08* (2006.01)

(52) U.S. Cl.
CPC ............ *G06F 17/153* (2013.01); *G06F 7/483* (2013.01); *G06N 3/08* (2013.01)

(58) Field of Classification Search
CPC .......... G06F 17/153; G06F 7/483; G06N 3/08
See application file for complete search history.

(56) References Cited

U.S. PATENT DOCUMENTS

| | | | |
|---|---|---|---|
| 8,644,643 | B2 | 2/2014 | Jiao et al. |
| 9,367,892 | B2 | 6/2016 | Wu et al. |
| 2018/0046916 | A1 | 2/2018 | Dally et al. |
| 2018/0096226 | A1 | 4/2018 | Aliabadi et al. |
| 2019/0266479 | A1* | 8/2019 | Singh ............... G06F 17/16 |
| 2019/0297326 | A1* | 9/2019 | Reda ................ G06T 5/20 |

* cited by examiner

*Primary Examiner* — Michael D. Yaary
(74) *Attorney, Agent, or Firm* — Dickinson Wright RLLP

(57) ABSTRACT

This application relates to a multi-layer convolution operation. The multi-layer convolution operation is optimized for a vector processing unit having a number of data paths configured to operate on vector operands containing a number of elements processed in parallel by the data paths. The convolution operation specifies a convolution kernel utilized to filter a multi-channel input and generate a multi-channel output of the convolution operation. A number of threads are generated to process blocks of the multi-channel output, each block comprising a set of windows of a number of channels of the multi-channel output. Each window is a portion of the array of elements in a single layer of the multi-channel output. Each thread processes a block in accordance with an arbitrary width of the block, processing a set of instructions for each sub-block of the block having a well-defined width, the instructions optimized for the vector processing unit.

20 Claims, 11 Drawing Sheets

TWO-DIMENSIONAL MULTI-LAYER CONVOLUTION FOR DEEP LEARNING

CROSS-REFERENCE TO RELATED APPLICATIONS

The present application claims the benefit of U.S. Provisional Application No. 62/806,659, entitled "TWO-DIMENSIONAL MULTI-LAYER CONVOLUTION FOR DEEP LEARNING," filed Feb. 15, 2019, the content of which is incorporated herein by reference in its entirety for all purposes.

FIELD

The described embodiments relate generally to algorithms for data processing. More particularly, the present embodiments relate to algorithms for two-dimensional multi-layer convolution operations.

BACKGROUND

Input signals can be filtered using convolution kernels, which is defined as a set of coefficients applied to a portion of the input signal to generate a value of an output signal. Various image processing operations (e.g., sharpening, blurring, edge detection, and the like) can be implemented using convolution operations associated with different convolution kernels. Machine learning algorithms, otherwise referred to as deep learning, can also utilize convolution operations when performing steps of the algorithm. For example, convolution neural networks include convolution layers that process sets of inputs with convolution kernels to generate sets of outputs. In multi-layer convolution operations, each output image is associated with a set of convolution coefficients for each input image, and an output pixel in a particular output image is the result of the convolution operation over all input images. For example, a single output image generated by a 5×5 convolution operation applied to N input images utilizes 25×N coefficients and requires the computation and accumulation of 25 partial products for each input image to generate each element of an output image. Therefore, a single output pixel on a single output channel will utilize 25×N partial products to calculate the value of the output pixel.

Processors are implemented to execute a number of instructions on one or more data paths. Different data paths are designed to implement different types of operations or similar operations on data in different formats. Typically, a single processor core can include an arithmetic logic unit, a floating point unit, and special function units such as a load/store unit. The arithmetic logic unit can be configured to perform operations such as addition, subtraction, multiplication, and division on integer operands, and the floating point unit can be configured to perform operations such as addition, subtraction, multiplication, and division on floating point operands.

Floating-point values are typically represented in software using the Institute of Electrical and Electronics Engineers (IEEE) 754-2008 single-precision, 32-bit format or the IEEE 754-2008 double-precision, 64-bit format. Conventional processors can execute a single fused multiply addition (FMA) operation within a particular data path of a processor core. For example, a data path can be designed using 32-bit registers that hold two single-precision floating-point operands that are multiplied together and added to a third single-precision floating-point value. These types of processors can be referred to as scalar processors.

Some processors are specially designed to implement instructions that operate on vector values rather than scalar values. These processors can be referred to as vector processors. For example, each instruction can operate on 128-bit registers that can hold four 32-bit floating point values. The instructions can be executed by four 32-bit data paths, in parallel, to produce four 32-bit results packed into a single 128-bit accumulator during a single clock cycle. Convolution operations can be executed more efficiently on vector processors because more than one element of the output signal can be processed simultaneously.

However, efficiency of the algorithms on vector processors can depend on how efficiently the registers can be packed for a given size output. For example, a w'×h'×c' input block is typically stored and processed in row major order to generate a w×h×c output block. Each row of an output image can be processed in sequence such that latency associated with memory accesses can be hidden. However, when the width of the output image is not a multiple of the size of the vector processed by the instructions executed by the vector processor, then each row may need padding to fill the last vector of the row. This creates inefficiencies where some data paths of the vector processor are unused for at least one instruction associated with each row of the output image. Depending on the dimensions w, h, and c, the efficiency of the convolution operation can vary significantly. Consequently, there is a desire for developing algorithms that can process multi-layer convolution operations for any dimension of signals in an efficient manner.

SUMMARY

This paper describes various embodiments that relate to multi-layer convolution operations. The multi-layer convolution operation can be implemented in software by a number of threads including instructions configured to be executed by a vector processing unit of a given width. Each thread is assigned a number of elements of the output of the convolution operation. Each thread can be assigned a block of the multi-layer output, the block comprising a number of windows of at least two channels of the multi-layer output. A series of instructions executed on the vector processing unit generate multiple elements of the block in parallel, stored in an accumulator of the vector processing unit. Each instruction can comprise a vector FMA instruction that multiplies a number of elements of the multi-channel input with a corresponding set of coefficients of the convolution kernel, adding the result to the value stored in the accumulator of the vector processing unit. The elements can be from a single channel of the multi-channel input or different channels of the multi-channel input.

In some embodiments, the convolution operation is performed by receiving a multi-channel input for the convolution operation and executing, by a processor that includes a vector processing unit of a particular width, a number of threads to filter the multi-channel input by a convolution kernel that includes a set of coefficients. Each channel of the multi-channel input comprises an array of elements. Each channel of the multi-channel output has a width that may not be equal to an integer multiple of the particular width of the vector processing unit. At least one thread in the number of threads is configured to perform an operation on a vector operand that includes one or more elements from two or more channels of the multi-channel input to generate elements for two or more channels of the multi-channel output.

In some embodiments, each channel of the multi-channel output comprises an image that includes a two-dimensional array of elements. A thread can be configured to divide each image into a number of windows, each window comprising a portion of the elements in the image. The thread can define a block that includes a set of corresponding windows for a number of channels of the multi-channel output. The thread can then assign the block to a child thread configured to be executed by the vector processing unit. In some embodiments, the child thread divides the block into one or more sub-blocks, each sub-block processed, sequentially, by a series of instructions corresponding to a corresponding width and number of channels of the sub-block. At least one sub-block can be processed by a series of instructions configured to generate elements of only one channel of the multi-channel output in an accumulator in parallel. At least one other sub-block can be processed by another series of instructions configured to generate elements of two or more channels of the multi-channel output in an accumulator in parallel.

In some embodiments, the processor includes two or more processor cores. Each processor cores can include one or more vector processing units. Each thread in the number of threads is scheduled to execute on a particular processor core in the two or more processor cores. In some embodiments, the vector processing unit includes four data paths configured to operate on four single-precision floating-point elements stored in a 128-bit register. In other embodiments, the vector processing unit includes 16 data paths configured to operate on 16 single-precision floating-point elements stored in a 512-bit register.

In some embodiments, the convolution operation is implemented within a convolution neural network. Multi-layer convolution operations are particularly suited for machine learning applications.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
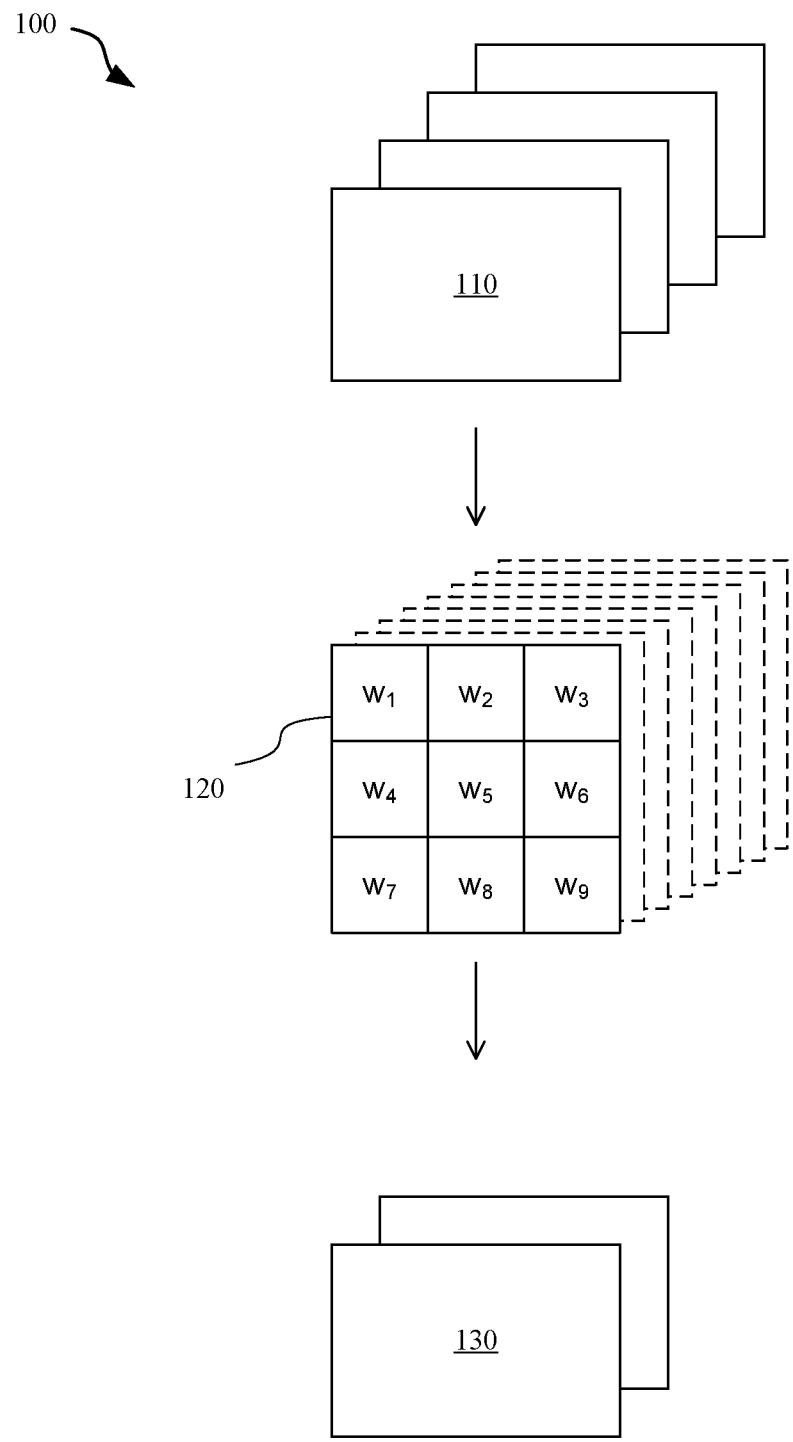
FIG. 1 illustrates a multi-layer convolution operation for filtering two-dimensional input images, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A multi-layer convolution operation is described below. The multi-layer convolution operation is optimized for a vector processing unit having a number of data paths configured to operate on vector operands containing a number of elements processed in parallel by the data paths. The convolution operation specifies a convolution kernel utilized to filter a multi-channel input and generate a multi-channel output of the convolution operation. A number of threads are generated to process blocks of the multi-channel output, each block comprising a set of windows of a number of channels of the multi-channel output. Each window is a portion of the array of elements in a single layer of the multi-channel output. Each thread processes a block in accordance with an arbitrary width of the block, processing a set of instructions for each sub-block of the block having a well-defined width, the instructions optimized for the vector processing unit.

A set of instructions for a sub-block is configured to optimize the efficient use of an accumulator within the vector processing unit based on the number of elements stored in the accumulator and a fixed width of the sub-block. A sub-block having a width equal to the width of the accumulator can be processed via instructions configured to operate on a vector operand containing elements of a single output channel of the multi-channel output, such that each instruction is associated with a different channel of the multi-channel output. In contrast, a sub-block having a width less than the width of the accumulator can be processed via instructions configured to operate on a vector operand containing elements from two or more channels of the multi-channel output to the convolution operation, each instruction associated with one or more elements from each channel of the two or more channels of the multi-channel output.

A master thread can be executed by a processor. The master thread can identify the width of the multi-channel output for a convolution operation and generate child threads to process different portions of the multi-channel output. Each child thread can be assigned a separate and distinct block of the multi-channel output. The child threads can be configured to determine a width of the block, which can take any arbitrary width, and divide the block into sub-blocks of well-defined widths. The sub-blocks are then processed, sequentially, by a set of instructions optimized for a sub-block of a particular size.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a multi-layer convolution operation 100 for filtering two-dimensional input images, in accordance with some embodiments. As depicted in FIG. 1, a number of two-dimensional images 110 are received as input to the convolution operation 100. Each image 110 comprises a two-dimensional array of scalar values. Each scalar value in the two-dimensional array can be referred to as an element or, alternatively, a pixel. In some embodiments, each element is a single-precision floating-point value comprising 32-bits. In other embodiments, each element can be represented using another format, such as double-precision floating-point, fixed-point, or integer formats.

Each layer of the multi-layer input can be referred to as a channel of the multi-layer input. In other words, each channel is a separate and distinct image in a set of images provided as the input to the convolution operation 100. In some embodiments, each channel can be a separate color channel of a single color image (e.g., red, green, blue, and alpha channels). In other embodiments, each channel can be a separate and distinct image, each image being unrelated to the other images in the set of images. Such embodiments are particularly suited to deep learning, where a convolution neural network (CNN) can be configured to process a large number of images to produce a result. For example, in a typically implementation of a CNN, the input to the CNN can include 512 separate and distinct images provided as different channels of the input.

The convolution operation 100 generates a number of two-dimensional images 130 as an output of the convolution operation 100. The number of output images 130 may not match the number of input images 110. In other words, the number of channels in the multi-layer output may not be equal to the number of channels in the multi-layer input. However, in some embodiments, the number of channels in the multi-layer output matches the number of channels of the multi-layer input.

Each channel of the output (e.g., each output image 130) is associated with a set of coefficients corresponding to each channel of the input (e.g., each input image 110). Each image 110 is processed by a corresponding convolution kernel 120, which is defined as a set of coefficients applied to a portion of the image 110 to generate a portion of an element of an output of the convolution operation. The intermediate values generated by processing each input image 110 with a corresponding convolution kernel 120 are then summed to produce the element for a particular output image 130. Each output image 130 can be associated with a set of convolution kernels 120, where a number of convolution kernels 120 associated with the output image 130 matches the number of input images 110. For example, as depicted in FIG. 1, each of two output images 130 is associated with four convolution kernels 120 corresponding to the four input images 110, for a total of eight sets of coefficients utilized by the convolution operation 100.

The convolution kernels 120 can be one-dimensional or two-dimensional. Each convolution kernel 120 can be as small as size 1×1, containing only one coefficient. In the one-dimensional case, the convolution kernel 120 can be of size d×1 or 1×d as applied to the rows or columns, respectively, of the image 110. In the two-dimensional case, the convolution kernel 120 can be of size $d_{row} \times d_{col}$ as applied to a two-dimensional window of the image 110. For example, common sizes of two-dimensional convolution kernels are 3×3 or 5×5, which include nine or twenty five coefficients, respectively.

Figure 2:
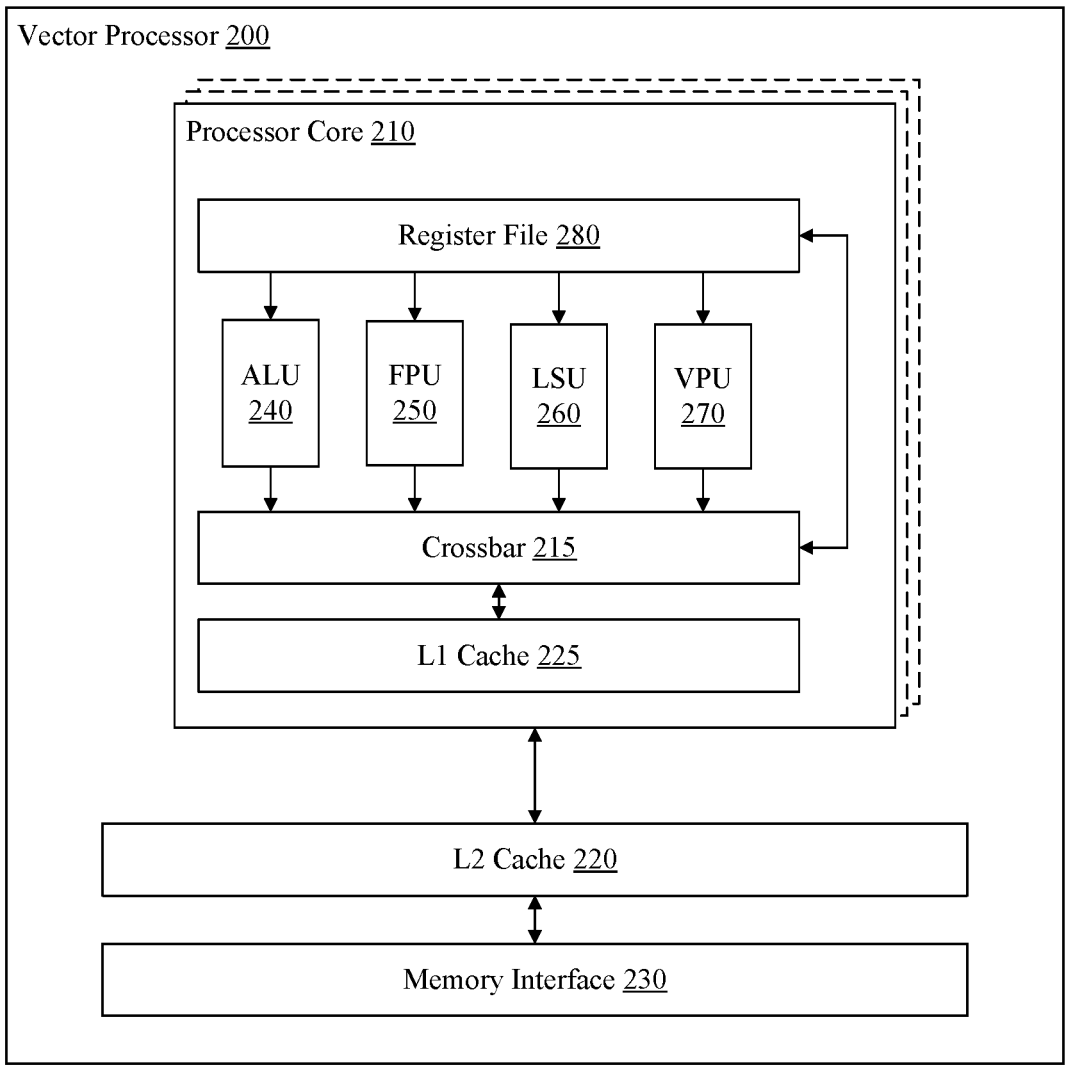
FIG. 2 illustrates a vector processor, in accordance with some embodiments.

FIG. 2 illustrates a vector processor 200, in accordance with some embodiments. The convolution operation can be implemented on the vector processor 200. In some embodiments, a software library is provided for implementing the convolution operation on the vector processor 200. The software library can include a set of instructions to process convolution operations of varying size and number of channels.

The vector processor 200 includes one or more processor cores 210. Each processor core 210 maintains architectural state including a number of registers in a register file 280, program counters, interrupt mask registers, instruction flag registers, and/or pipeline registers. The architectural state can be referred to as a processor context. The specific data included in the architectural state can vary depending on the implementation of the processor.

In some embodiments, a processor core 210 can maintain multiple sets of architectural state per processor core 210 to implement simultaneous multi-threading (SMT). For example, a processor core 210 can maintain two program counter registers, two sets of operand registers, two sets of interrupt mask registers, and so forth to implement SMT for two threads. SMT enables the processor core 210 to switch between two or more threads without having to switch the processor context by storing the architectural state for the active thread to a memory and loading architectural state for a different thread from the memory.

As depicted in FIG. 2, the vector processor 200 includes a multi-level memory hierarchy including a level 1 (L1) cache 225 in each processor core 210 and a level 2 (L2) cache 220 shared by multiple processor cores 210. The L2 cache 220 is coupled to a memory interface 230 that is attached to pads of the integrated circuit of the vector processor 200, which are coupled to an external memory device such as a dynamic random access memory (DRAM). Although not shown explicitly, the L1 cache 225 can be divided into an instruction cache and a data cache storing instructions and data, respectively. Additional units of the processor core 210, such as a fetch unit, decode unit, branch prediction unit, and the like, can load instructions for a thread into the instruction cache such that an instruction is ready to be executed when the program counter points to an address for the instruction.

After an instruction has been decoded, control logic for the processor core 210 configures one or more functional units of the processor core 210 to execute the instruction. In some embodiments, the processor core 210 includes an arithmetic logic unit (ALU) 240, a floating-point unit (FPU) 250, a load/store unit (LSU) 260, and a vector processing unit (VPU) 270. The ALU 240 is configured to execute instructions to perform arithmetic operations such as addition, subtraction, multiplication, and division utilizing integer operands. The FPU 250 is configured to execute instructions to perform arithmetic operations such as addition, subtraction, multiplication, and division utilizing floating-point operands. The ALU 240 and FPU 250 operate on scalar values of, typically, 32 or 64 bits. The LSU 260 is configured to execute instructions to load values from external memory into the register file 280 and/or store values from the register file 280 to the external memory. The LSU 260 interacts with the external memory indirectly via the L1 cache 225. The VPU 270 is configured to execute instructions to perform arithmetic operations such as addition, subtraction, multiplication, and division utilizing vector operands. The VPU 270 provides the vector processor 200 with the ability to execute single instruction multiple data (SIMD) instructions.

In some embodiments, the register file 280 includes registers sized to store vector operands. A vector operand refers to an operand having a number of bits that is an integer multiple of a bit width of the data paths implemented by the VPU 270. For example, the VPU 270 can be implemented to include four parallel data paths, configured to operate on single-precision floating-point operands (e.g., 32-bits). A register for a vector operand for such an implementation of the VPU 270 can be sized to hold, e.g., 128 bits, which can store four separate elements of data (e.g., single-precision floating-point values) for the four parallel data paths. Consequently, a single vector instruction can be executed by the VPU 270, which loads vector operands containing four elements from the register file 280 and generates four single-precision values stored in a 128-bit accumulator register in parallel. It will be appreciated that although the VPU 270 has been described as using 128-bit registers containing four elements, other embodiments of the VPU 270 can utilize 256-bit registers containing eight elements, 512-bit registers containing 16 elements, 256-bit registers containing four double-precision floating-point elements, 512-bit registers containing eight double-precision floating-point elements, 128-bit registers containing eight half-precision floating-point elements, and so forth. The number of parallel data paths implemented within the VPU 270 should equal the number of elements stored in the registers for the vector operands.

In some embodiments, the outputs of the functional units are connected to a crossbar 215 or other type of switchable interconnect used to route signals between the functional units, the register file 280, and/or the L1 cache 225. For example, the crossbar 215 can be configured to connect the output of a functional unit, such as the FPU 250 or the VPU 270 to a write port of the register file 280 such that a result generated by the functional unit is written to a particular register, which can then be utilized as an operand for a subsequent instruction executed by the functional unit. As another example, the LSU 260 can provide a value from a register in the register file 280 to the L1 cache 225 to write the value to the external memory.

It will be appreciated that the architecture of the vector processor 200 depicted in FIG. 2 is merely one example of a vector processor 200 and other architectures are contemplated as being within the scope of the present disclosure. For example, each processor core 210 can include two or more VPUs 270 in addition to the other functional units such that multiple vector operations can be performed in parallel. Other components of the processor 200 have been omitted for clarity. For example, clock generation and distribution circuits, scheduling logic, and various buses or interconnects have been omitted to avoid obscuring the description of the embodiments.

Figure 3:
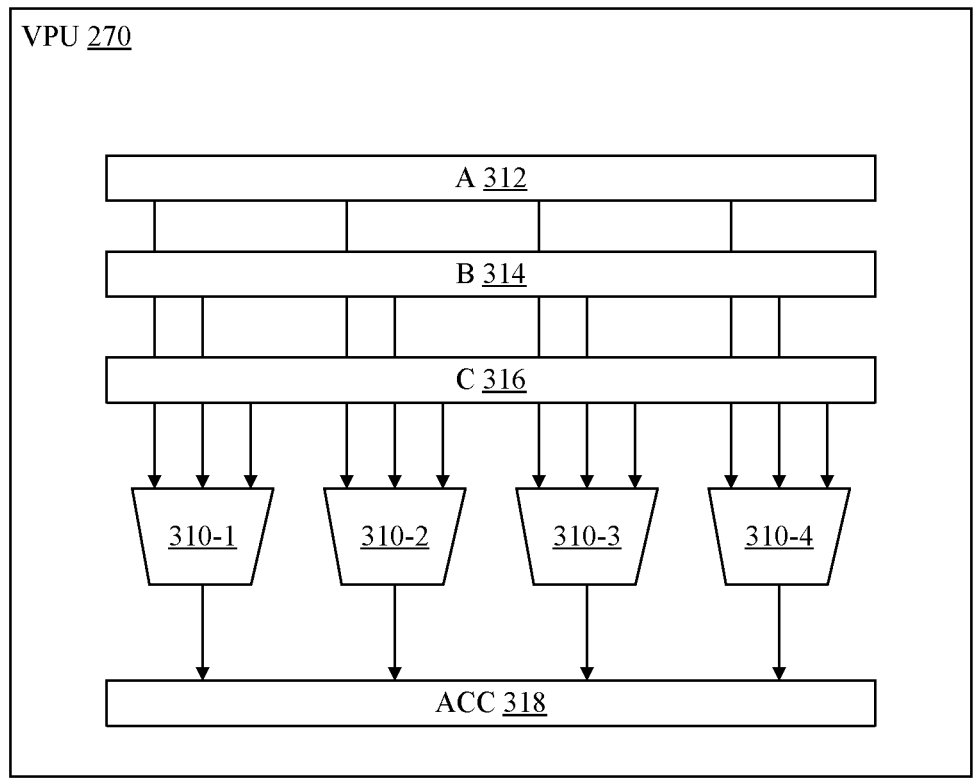
FIG. 3 illustrates the vector processing unit, in accordance with some embodiments

FIG. 3 illustrates the VPU 270, in accordance with some embodiments. The VPU 270 includes a number of data paths 310 operating in parallel. The data paths 310 share access to vector operands stored in special registers in the VPU 270. In some embodiments, the data paths 310 are floating-point data paths configured to execute FMA instructions that have three input operands and one output operand. The input operands are stored in input collectors A 312, B 314, and C 316. Input operands are read from the register file 280 and latched in the corresponding input collector until the instruction is ready to be executed. The vector output, combining the output elements of the data paths 310, is stored in an accumulator 318.

In some embodiments, an FMA instruction causes each data path 310 to read a first element from the input collector A 312 and read a second element from the input collector B 314. The first element is multiplied by the second element to generate a product, which is then added to a third element read from the input collector C 316. The result of the addition of the product and the third element is stored in the accumulator 318. In some embodiments, the VPU 270 can be configured to write the result stored in the accumulator register 318 into the input collector C 316 such that the result can be added to a new product calculated using new operand(s) loaded into at least one of the input collector A 312 or input collector B 314 during a subsequent FMA instruction.

Again, in other embodiments, the VPU 270 can include a different number of data paths 310 operating in parallel and sharing elements from vector operands stored in the input collectors. In yet other embodiments, the data paths 310 can be configured to operate on 16-bit, 64-bit, or 128-bit elements rather than 32-bit elements. In still other embodiments, the VPU 270 can include, in addition to or in lieu of data paths 310, additional data paths and registers configured to operate on integer elements rather than floating-point elements. In some embodiments, the vector processor 200 includes the VPU 270 in lieu of the ALU 240 and the FPU 250.

Figure 4:
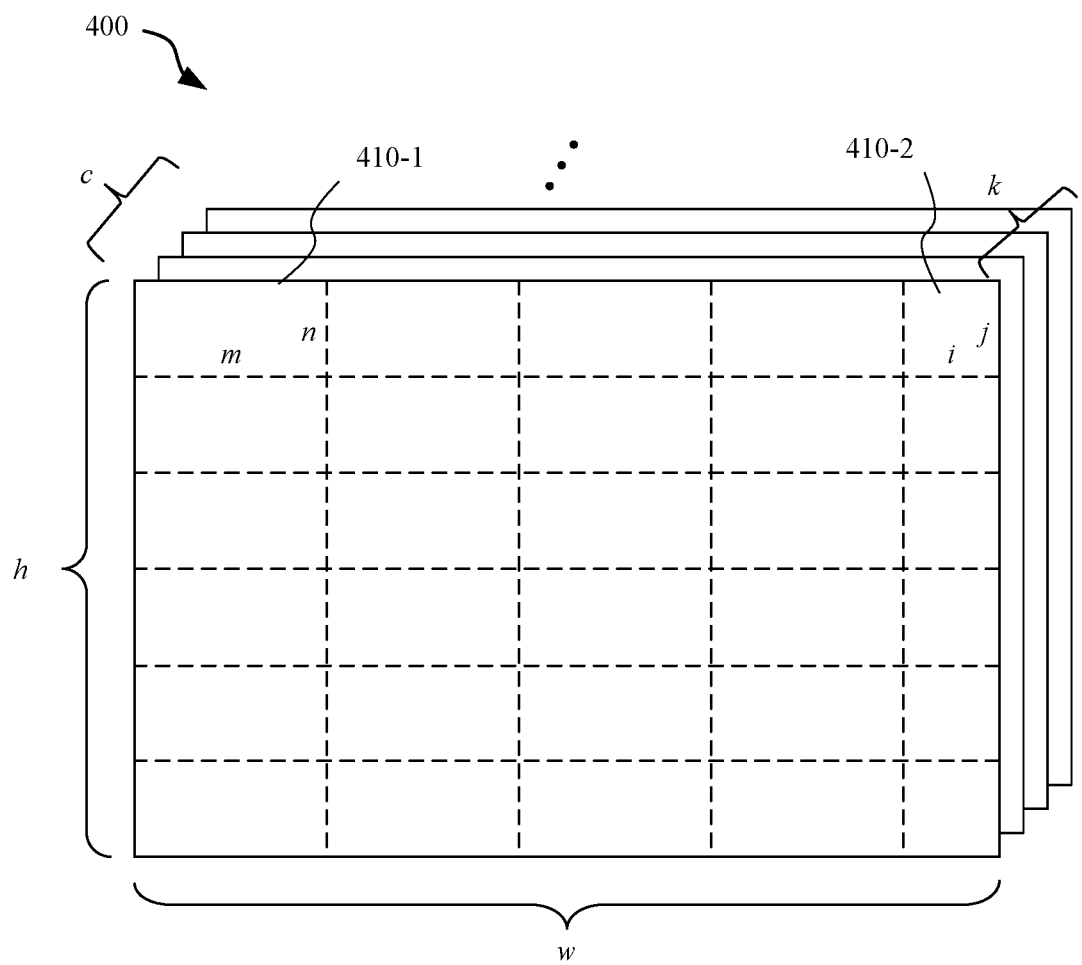
FIG. 4 illustrates a multi-layered output of the convolution operation, in accordance with some embodiments.

FIG. 4 illustrates a multi-layered output 400 of the convolution operation 100, in accordance with some embodiments. Again, the output 400 can include two or more layers or channels, and each channel can be referred to as an image 130. Each element of the image 130 is calculated by generating a sum of partial products, each partial product comprising a result of multiplying a particular element of a particular input image 110 with a corresponding coefficient of a convolution kernel 120. Again, each element of the output 400 is a sum of partial products generated by convolving a convolution kernel with a corresponding input image 110 over the full set of input images 110.

In some embodiments, the convolution operation 100 is implemented using a number of threads. Each thread can be optimized for a block of elements associated with two or more channels of the output 400. As depicted in FIG. 4, each channel of the output 400 is divided into a number of m×n windows 410. The size of each window is optimized in accordance with the width of the VPU 270 configured to execute the thread. As used herein, the width of the VPU 270 refers to the number of parallel data paths configured to process the elements of a vector operand in parallel. For example, the width of the VPU 270 shown in FIG. 3 is four. The width m of the window can be selected as an integer multiple of the width of the VPU 270 such that each row of the window can be processed by instructions where the data paths are fully utilized with 100% efficiency. In some embodiments, the width of the VPU 270 is 16 and an optimal width of the window is 48 (e.g., three times of the width of the VPU 270).

It will be appreciated that the width of the output 400, shown as dimension w, may not be evenly divisible by an integer multiple of the width of the VPU 270, shown as dimension m. More specifically, a final block 410-2 at the end of each row of the output 400 can have a width i that is less than the width m of the first block 410-1 at the beginning of each row of the output 400. The final block 410-2 can be referred to as a remainder and represents a number of output channel elements that will not fill an accumulator of the VPU 270. For example, where m×n×c is set at 32×1×8 when the VPU 270 has a width equal to sixteen, and the output 400 is of size w×h×c of 150×1×8, then the size of the last block 410-2 in the output 400 is of size i×j×k of 22×1×8. The instructions for processing the last block 410-2 would include one set of instructions for each output channel processing 16 elements of a row and another set of instructions processing 6 remaining elements of a row, where 10 data paths for each output channel are disabled during the second set of instructions. This is not an efficient use of the VPU 270.

It will be appreciated that the efficiency of a convolution algorithm that processes, sequentially, each row of each window of the output 400 is dependent on the width of the output 400. The efficiency will increase, generally, as the width of the output 400 increases because only the last set of elements of each row of the two-dimensional array, included in the final window of each row, will underutilize the data paths of the VPU 270 as long as the algorithm is tailored to select a window size based on the width of the VPU 270. Nevertheless, and as described below, the impact of this inefficiency can be reduced by combining the processing of multiple channels of the output 400 in a single thread.

According to some embodiments, a convolution algorithm can be utilized to reduce the impact of aforementioned inefficiency by selectively processing each (m×n×c) block 410 of the output 400 in accordance with respective width processing techniques that correspond to the width of the block 410. A first width processing technique processes a single output channel in each accumulator. For a given weight packing, this processing technique can be implemented by loading an input register with multiple input elements and broadcasting a weight register for each output channel accumulator. A second depth processing technique processes multiple output channels in each accumulator. For a given weight packing, this processing technique can be implemented by loading a weight register with weights corresponding to multiple channels and broadcasting an input element for each accumulator. The first width processing technique can be utilized when the width of the block 410 is equal to an integer multiple of the width of the VPU 270. The second depth processing technique is utilized when the width of the block 410 is smaller than the width of the VPU 270. A combination of both techniques can be utilized when the width of the block 410 is larger than the width of the VPU 270 but is not an integer multiple of the width of the VPU 270. The number of output channels, c, associated with the block 410 can be selected to ensure that the data paths of the VPU 270 remain fully utilized even when the width of the block is less than the width of the VPU 270.

Figure 5:
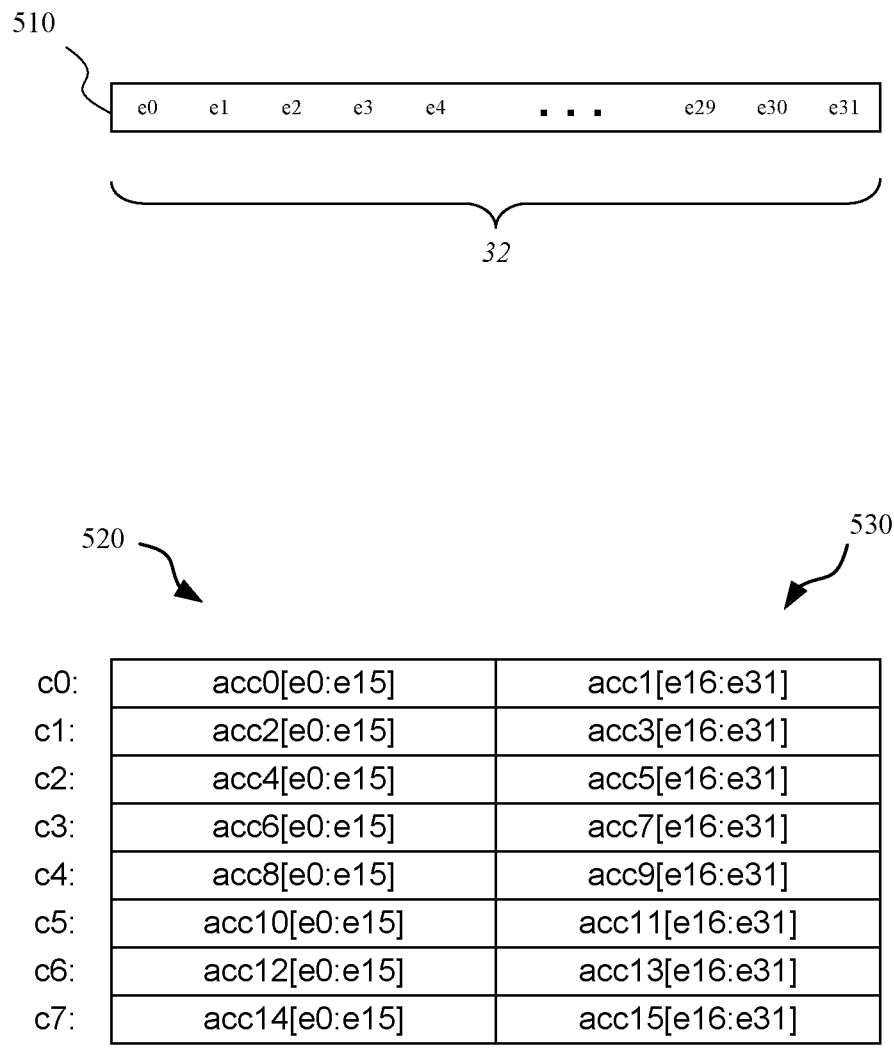
FIG. 5 illustrates a technique for processing a block of the multi-layer output, in accordance with some embodiments.

FIG. 5 illustrates a technique for processing a block of the multi-layer output, in accordance with some embodiments. A thread is generated to process the block of the multi-channel output. Again, a block refers to a set of windows from two or more channels of the multi-channel output. The thread is configured to optimize the processing of the block by dividing the block into a number of sub-blocks of particular width and processing each sub-block according to a different algorithm optimized for that sub-block. Each of the sub-blocks is optimized for a set width, and the sub-blocks can be combined to fit a block of any arbitrary width.

The code for processing each sub-block is optimized to utilize the VPU 270 as efficiently as possible. Given a vector size of 16 elements processed by the VPU 270 (e.g., a width of the VPU 270 is 16), then code for processing a sub-block of 32 elements in width can be defined that is fully efficient. For example, a block of size m×n×c of 32×8×8 requires 16 accumulators to generate 256 elements of the window for each channel in the block when the vector size is 16 elements. In other words, a total of 128 accumulators are required to process a corresponding block with 8 different channels. Each row 510 in a window requires two accumulators to generate the 32 elements of the row. A first series of instructions are executed by the VPU 270 to generate elements e0 to e15 in a first accumulator 520, and a second series of instructions are executed by the VPU 270 to generate elements e16 to e31 in a second accumulator 530. The first series and second series of instructions are repeated for a corresponding row in each of the eight channels, c0 through c7. The entire process can then be repeated for the next row in the window until the processing of the sub-block of 32 elements×8 rows×8 channels is complete.

It will be appreciated that the instructions for processing a row of elements that is an integer multiple of the vector size utilize accumulators in a manner where a particular accumulator of the VPU 270 is configured to generate elements of a single channel in the multi-channel output. In other words, the elements stored in an accumulator at any one time represent adjacent elements in a row of a particular channel of the output 400. This can be performed extremely efficiently because a row of each input is loaded and then a weight is broadcast to all of the data paths in the VPU 270, allowing each operand to be loaded from memory in a single memory access. However, when the width of the sub-block is not an integer multiple of the vector size, then a different approach is taken for the sub-block.

Figure 6A:
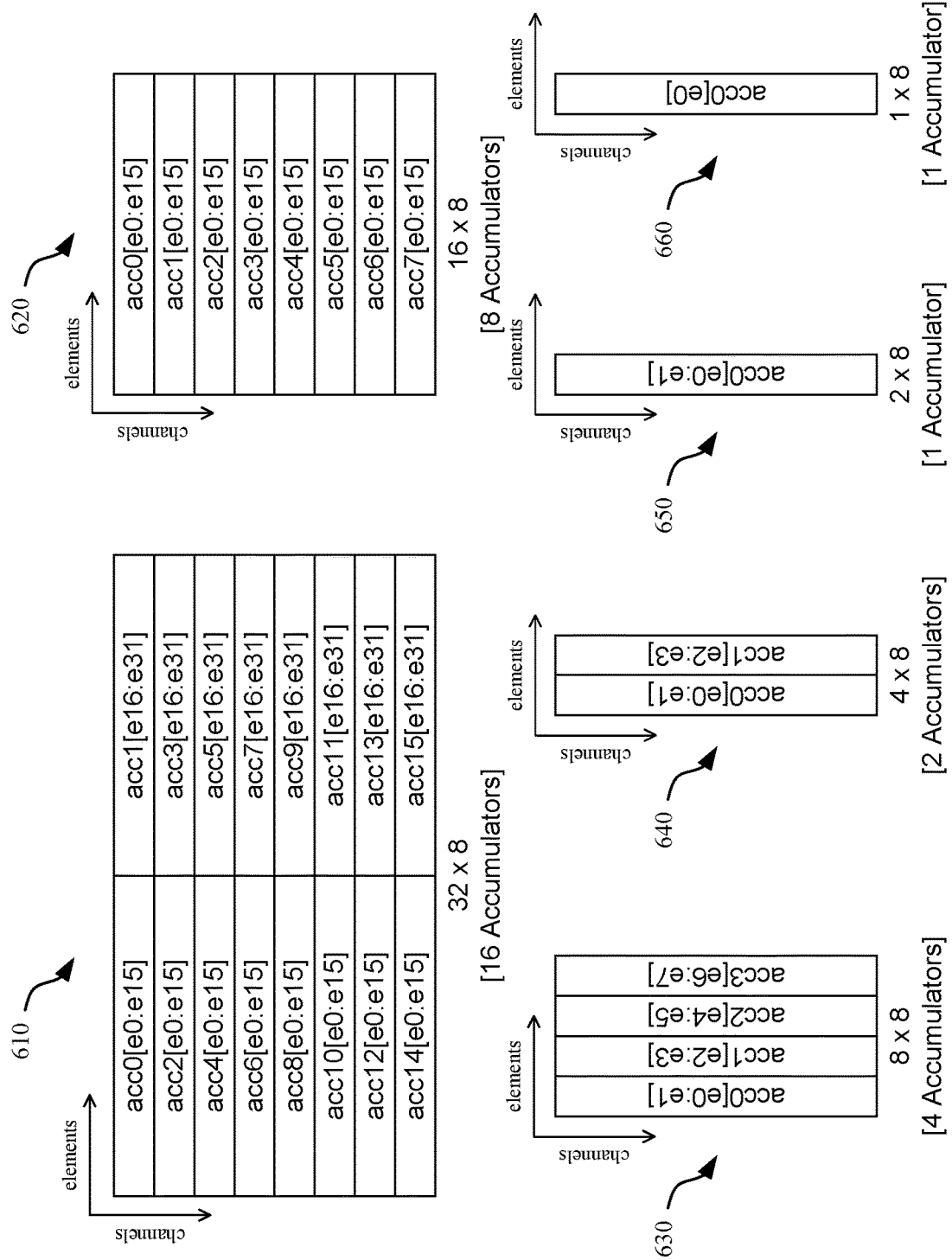
FIG. 6A illustrates a technique for efficiently packing accumulators when processing sub-blocks of various widths, in accordance with some embodiments.

FIG. 6A illustrates a technique for efficiently packing accumulators when processing sub-blocks of various widths, in accordance with some embodiments. In order to keep efficiency high when the width of a sub-block is not an integer multiple of the width of the VPU 270, an alternative packing scheme can be utilized for processing elements of the multi-channel output. Instead of always utilizing an accumulator to generate elements of a single channel, elements from a number of channels of the output are packed into the accumulator in an effort to maintain full efficiency. As shown in FIG. 6A, the sub-blocks are optimized for a VPU 270 of vector size equal to 16.

For example, as depicted in FIG. 6A, a 32 element×8 channel sub-block 610 and a 16 element×8 channel sub-block 620 can be processed according to the technique described above in conjunction with FIG. 5. It will be appreciated that each row processed in a sub-block of 16 elements only requires one accumulator and one series of instructions to generate the 16 elements of the row. Furthermore, 48 element×8 channel sub-blocks and 64 element×8 channel sub-blocks can be defined by utilizing additional accumulators to process the sub-block. Alternatively, the sub-blocks 610 or 620 can be combined to process block widths of 48 or 64 elements, sequentially.

In some embodiments, a different technique can be employed for sub-blocks having widths less than the vector size. In such cases, each row of the sub-block only requires a portion of one accumulator to generate the elements of the row. Therefore, at least a portion of the data paths in the VPU 270 would be disabled during the processing of that row when using the technique described above. Instead, for sub-block widths less than the width of the VPU 270 (e.g., the vector size), an accumulator is configured to generate element(s) from each channel in the number of channels assigned to the thread, and the elements for a particular row of the sub-block can be divided into one or more accumulators.

Where eight output channels are assigned to a thread and the width of the sub-block is eight elements, the elements of the output can be divided into four accumulators, with each accumulator assigned two elements of a particular row from each of the 8 channels of the output. For example, for a 8 element×8 channel sub-block 630, a first series of instructions are executed by the VPU 270 to generate elements e0 and e1 for all eight channels of the output in a first accumulator, a second series of instructions are executed by the VPU 270 to generate elements e2 and e3 for all eight channels of the output in a second accumulator, a third series of instructions are executed by the VPU 270 to generate elements e4 and e5 for all eight channels of the output in a third accumulator, and a fourth series of instructions are executed by the VPU 270 to generate elements e6 and e7 for all eight channels of the output in a fourth accumulator.

Where eight output channels are assigned to a thread and the width of the sub-block is four elements, the elements of the output can be divided into two accumulators, with each accumulator assigned two elements of a particular row from each of the 8 channels of the output. For example, for a 4 element×8 channel sub-block 640, a first series of instructions are executed by the VPU 270 to generate elements e0 and e1 for all eight channels of the output in a first accumulator and a second series of instructions are executed by the VPU 270 to generate elements e2 and e3 for all eight channels of the output in a second accumulator.

Where eight output channels are assigned to a thread and the width of the sub-block is two elements, the elements of the output can be divided into a single accumulator, with each accumulator assigned two elements of a particular row from each of the 8 channels of the output. For example, for a 2 element×8 channel sub-block 650, a first series of instructions are executed by the VPU 270 to generate elements e0 and e1 for all eight channels of the output in a first accumulator.

Where eight output channels are assigned to a thread and the width of the sub-block is one element, the elements of the output can be divided into a single accumulator, with each accumulator assigned one element of a particular row from each of the 8 channels of the output. For example, for a 1 element×8 channel sub-block 660, a first series of instructions are executed by the VPU 270 to generate element e0 for all eight channels of the output in a first accumulator. It will be appreciated that, where there are only eight elements in the sub-block, the accumulator may not be fully utilized if the width of the VPU 270 is 16. However, in some embodiments, the number of channels assigned to a sub-block is set equal to the width of the VPU 270 such that accumulators can always be fully utilized, even when the width of a sub-block is only one element.

Any arbitrary block size having a width in the range of 1 to 63 can then be processed by dividing the block into a series of sub-blocks shown in FIG. 6A. For example, a block of width 21 can be processed using the 16 element×8 channel sub-block 620, the 4 element×8 channel sub-block 640, and the 1 element×8 channel sub-block 660 to process the elements of the block. The convolution operation 100, executed using these techniques, is more efficient that simply processing each channel of the output 400, in sequence, according to the technique illustrated by FIG. 5.

More specifically, by combining elements from different output channels into the same accumulator, weights from the convolution kernels 120 can be loaded into the input collector and then elements from the different input channels can be broadcast to each of the data paths. This can be performed extremely efficiently because an initial operation for processing the sub-block can rearrange the weights in the memory, interleaved, and then weights for multiple output channels can be loaded in a single memory access request. In this case, vectors of weights for different output channels are loaded into an input collector and elements from the input are broadcast to each of the data paths of the VPU 270. Again, this ensures that each of the operands can be loaded from a single memory access request rather than requiring memory stride operations to pack a vector with values from multiple, disparate locations in the memory.

Even if the weights for the convolution kernels are not interleaved during a pre-processing operation, the technique described above is still more efficient because the convolution kernels are typically very small, meaning that all of the weights for the convolution kernels required to process a sub-block can be loaded into a modest sized cache and quickly accessed to pack the registers for a subsequent operation using the load/store unit while the VPU 270 is performing a current operation. For example, even if each set of coefficients is stored in a different separate and distinct cache line, the total number of cache lines required to store the weights for processing a particular block of the output is equal to the total number of channels included in the block (e.g., 8 cache lines). Thus, the coefficients can be loaded into the cache at the beginning of processing a block and then quickly accessed during the processing of a large number of operations associated with calculating the elements of the block.

It will be appreciated that, in other embodiments, the number of channels included in each block can be different. For example, 16 channels can be included in a block. In such cases, the number of elements from each channel included in an accumulator can be different than that described above for certain sub-blocks. For example, a set of instruction for an 8 element×16 channel sub-block can be defined and executed for eight accumulators, where each accumulator holds one element from each of the 16 channels.

In other embodiments, the accumulators can be utilized in a manner that generates elements for at least two, but not all, of the channels. For example, the 8 element×8 channel sub-block 630 can be adjusted such that the first accumulator generates elements e0 to e3 for each of channels c0 to c3 and the second accumulator generates elements e4 to e7 for each of channels c0 to c3. Then, the third accumulator generates elements e0 to e3 for each of channels c4 to c7 and the fourth accumulator generates elements e4 to e7 for each of channels c4 to c7. Alternatively, the first accumulator generates elements e0 to e7 for each of channels c0 to c1 and the second accumulator generates four elements e0 to e7 for each of channels c2 to c3. Then, the third accumulator generates elements e0 to e7 for each of channels c4 to c5 and the fourth accumulator generates elements e0 to e7 for each of channels c6 to c7.

It will be appreciated that the number of channels assigned to a thread should also be related to a width of the VPU 270. In some embodiments, the number of channels assigned to a block is equal to the width of the VPU 270. This ensures that even for a block of width one, a single accumulator can be fully utilized when processing a sub-block of one element width.

In some cases, a thread for processing a block can spawn child threads to process each of the sub-blocks in parallel, where the child threads can be executed on different VPUs 270 on different processor cores 210. The parent thread is configured to determine the width of the block and divide the block into various sub-blocks of minimum width of one element, the widths of the various sub-blocks are powers of 2 (e.g., 1, 2, 4, 8, 16, etc.).

It will be appreciated that a multi-layer convolution operation 100 for a CNN or other types of deep learning can typically include a large number of channels, such as 512 channels. Thus, each block assigned to a thread is a combination of a window from each of a subset of the total number of channels. For example, each block can comprise eight windows of eight channels of the 512 channels of the output.

Figure 6B:
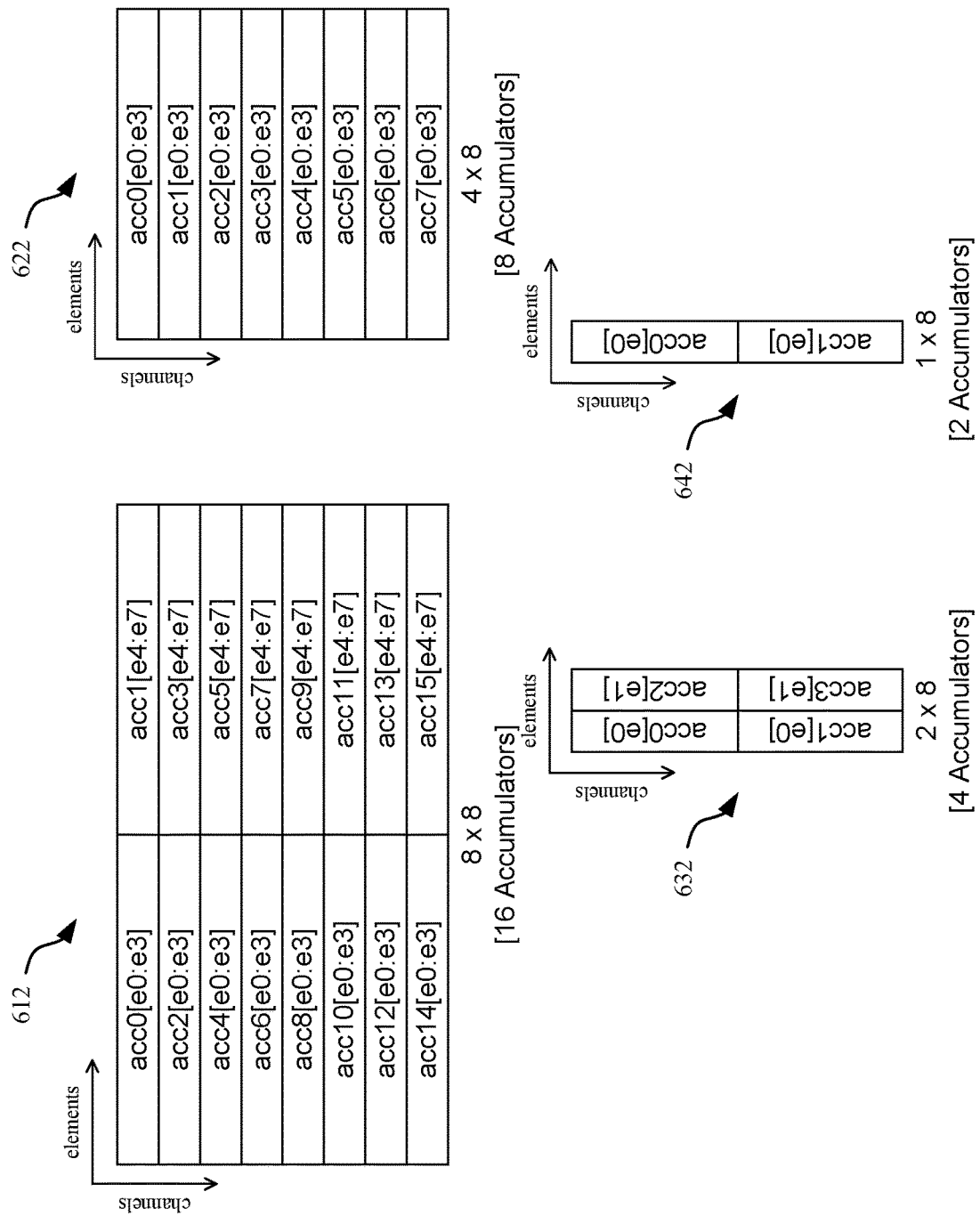
FIG. 6B illustrates a technique for efficiently packing accumulators when processing sub-blocks of various widths, in accordance with other embodiments.

FIG. 6B illustrates a technique for efficiently packing accumulators when processing sub-blocks of various widths, in accordance with other embodiments. As shown in FIG. 6B, the sub-blocks are optimized for a VPU 270 of vector size equal to 4, as depicted by the VPU 270 of FIG. 3.

In some embodiments, an 8 element×8 channel sub-block 612 and a 4 element×8 channel sub-block 622 can be processed according to the technique described above in conjunction with FIG. 5. The sub-blocks 612 and 622 are similar to sub-blocks 610 and 620, except each accumulator only holds 4 values instead of 16.

Where eight output channels are assigned to a thread and the width of the sub-block is two elements, the elements of the output can be divided into four accumulators, with each accumulator assigned one element of a particular row from half of the 8 channels of the output. For example, for a 2 element×8 channel sub-block 632, a first series of instructions are executed by the VPU 270 to generate element e0 for channels c0 to c3 of the output in a first accumulator, a second series of instructions are executed by the VPU 270 to generate element e0 for channels c4 to c7 of the output in a second accumulator, a third series of instructions are executed by the VPU 270 to generate element e1 for channels c0 to c3 of the output in a third accumulator, and a fourth series of instructions are executed by the VPU 270 to generate element e1 for channels c4 to c7 of the output in a fourth accumulator.

Where eight output channels are assigned to a thread and the width of the sub-block is one element, the elements of the output can be divided into two accumulators, with each accumulator assigned one element of a particular row from half of the 8 channels of the output. For example, for a 1 element×8 channel sub-block 642, a first series of instructions are executed by the VPU 270 to generate element e0 for channels c0 to c3 of the output in a first accumulator, and a second series of instructions are executed by the VPU 270 to generate element e0 for channels c4 to c7 of the output in a second accumulator.

In some embodiments, the block can be limited to include a number of channels equal to the width of the VPU 270. For example, the sub-blocks of FIG. 6B can be limited to 4 channels instead of 8 channels such that sub-blocks 632 and 642 only require one accumulator to process each element from each of the four channels rather than two accumulators for each element of eight channels.

Figure 7:
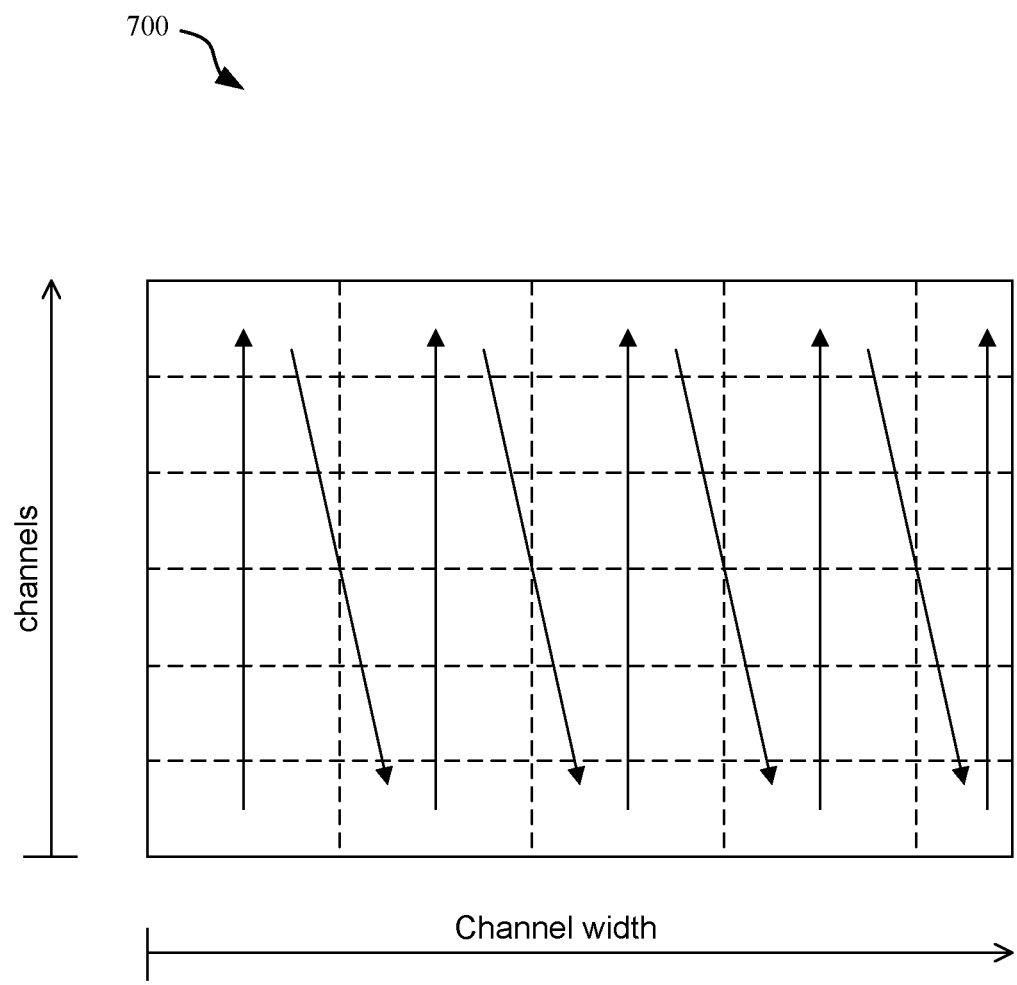
FIG. 7 illustrates a processing order for a number of blocks of the multi-layer output, in accordance with some embodiments.

FIG. 7 illustrates a processing order 700 for a number of blocks of the multi-layer output, in accordance with some embodiments. As described above, each thread is assigned a block of the multi-layer output to process. In some embodiments, a master thread spawns child threads and assigns each block in the multi-layer output to a corresponding child thread. The master thread can be configured to implement a nested loop structure to generate the threads for the blocks.

In some embodiments, as depicted in FIG. 7, the master thread implements an outer loop that iterates through the elements of a row of the output, and an inner loop that iterates through the channels of the output. Selecting an optimum width for a block based on, e.g., an integer multiple of a vector width for the target processor, the outer loop selects a group of elements of the optimum width starting at element e0 on the left edge of an image. The inner loop then iterates through the channels of the output, spawning a new thread for a block that includes a window of each layer for a number of channels. The number of channels can be based on the vector width (e.g., equal to the vector width, half the vector width, double the vector width, etc.). Additional child threads are spawned until all of the channels in the inner loop have been processed. The outer loop then selects the next group of elements and resets the inner loop to start spawning child threads for the first channel of the output.

In some embodiments, during each iteration of the outer loop, the master thread can "look ahead" to the number of remaining elements during the next iteration of the outer loop. The number of remaining elements can be less than the optimal width. In such cases, the master thread can assign a block size greater than the optimal width to process the remainder of the elements at the end of a row with the elements in the current block. For example, when an optimal width is 32 elements, the master thread can specify a block size between 33 and 63 elements when the number of remaining elements is between 1 and 31. This can obviate the need to iterate through the outer loop one more time to process blocks of sub-optimal width. The child thread assigned to these larger blocks can then divide the blocks into a number of sub-blocks to process the arbitrary width of the larger block.

It will be appreciated that the processing order above is appropriate for a window size of one row or multiple rows, where a block is processed one row at a time by a particular thread. In some embodiments, the number of rows in each channel is iterated through by a third loop within the master thread, such that blocks are assigned to threads for a first number of rows, starting at the top of the image, and proceeding in a manner as shown in FIG. 7, and then the next number of rows in the image is selected and blocks are assigned to additional threads for the next number of rows. The process is repeated until all rows of the image have been processed. In other embodiments, the loop ordering can be switched such that blocks are assigned to threads iterating in any order of elements, rows, and channels. For example, the outer loop can iterate through channels of the output, while the inner loop iterates through elements of the rows.

Figure 8:
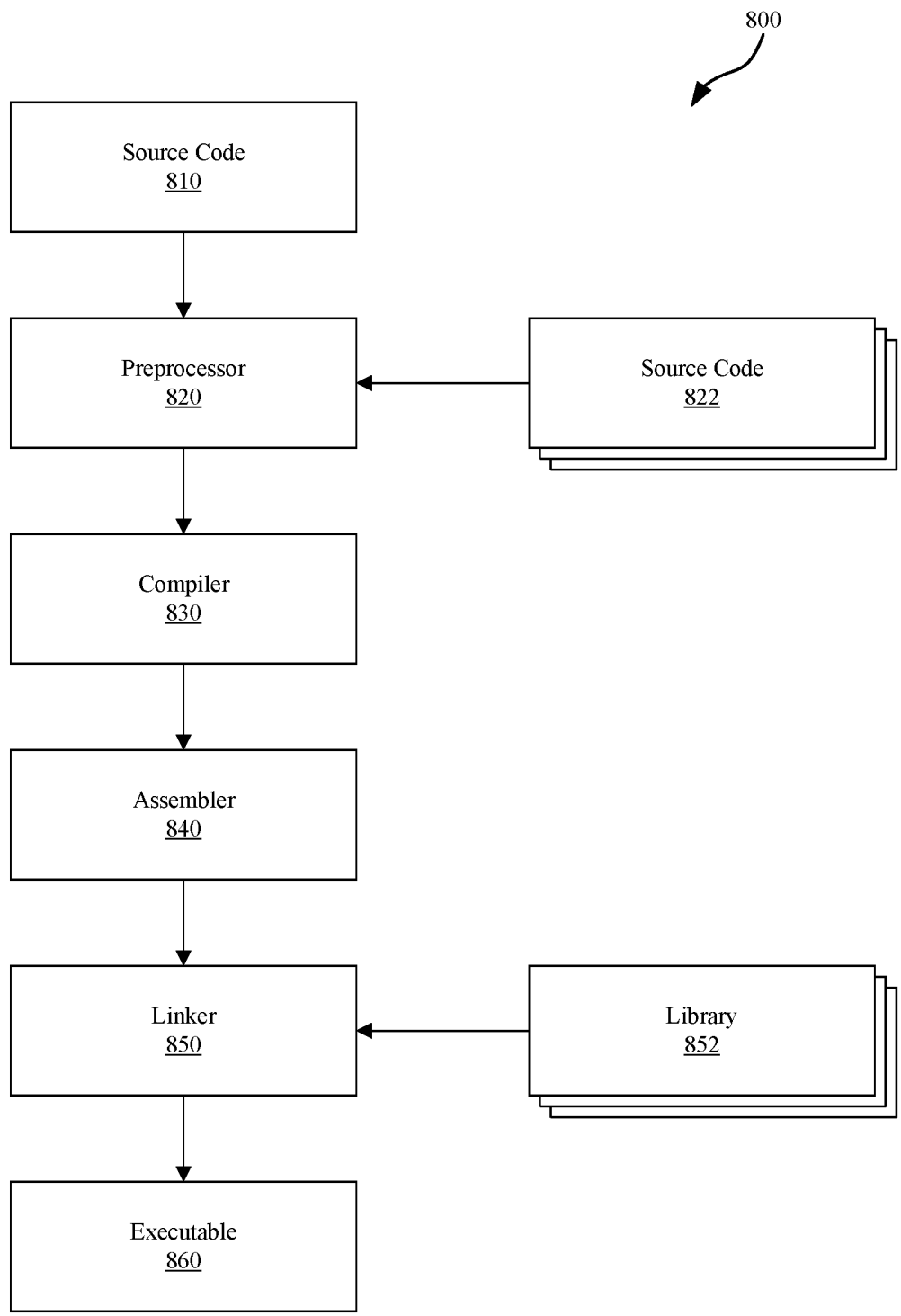
FIG. 8 illustrates a workflow for compiling source code into an executable program, in accordance with some embodiments.

FIG. 8 illustrates a workflow 800 for compiling source code into an executable program, in accordance with some embodiments. As shown in FIG. 8, a software developer generates source code 810 for an application. The source code 810 can be written in a variety of programming languages. The first step in compiling the source code 810 is performed by a program called a preprocessor 820. The preprocessor 820 parses the source code 810 and expands preprocessor directives such as macros, conditional compiler statements, and include statements. In some cases, the preprocessor 820 can replace a preprocessor directive included in the source code 810 with additional source code 822 in one or more separate files.

The pre-processed source code is then processed by the compiler 830, which converts the source code from a high-level language to an assembly language. The converted source code is then processed by the assembler 840, which converts the source code from the assembly language to machine code, which can be referred to as an object file. Finally, the object file is processed by the linker 850, which links the object file with libraries 852 (e.g., additional pre-compiled object files) to produce an executable program 860.

It will be appreciated that the techniques described above for performing a convolution operation can be implemented in multiple ways. For example, referring to various parts of FIG. 8, the source code 810 can include high-level program code that, when compiled into the executable program 860 and executed by the vector processor 200, causes the vector processor 200 to receive a multi-channel input and a set of filter coefficients for a convolution kernel, divide the multi-channel output into a number of blocks based on a width of a vector processing unit, and generate the elements for each block using a number of threads, each thread assigned a block of the multi-channel output.

In some embodiments, the high-level program code can be generated by a first software developer and provided to a second software developer as a software framework within one or more of the additional source code 822 files. The second software developer can then utilize the functions included in the software framework to include similar functionality related to performing convolution operations as described in more detail above. For example, the software framework could provide constructors and methods for implementing a convolution filter object. The constructors can include arguments to specify the set of filter coefficients in a convolution kernel for the convolution filter object. The convolution filter object can include public methods for applying the convolution filter object to a multi-channel input signal to filter the multi-channel input signal and generate a multi-channel output signal. The convolution filter object can also include private methods for dividing the multi-channel output into a number of blocks assigned to a number of child threads. This software framework enables the second software developer to quickly implement a particular convolution kernel in their source code and filter multi-channel input signals using the optimized technique described above to increase the efficiency of the convolution operation for a particular target processor.

In yet other embodiments, a software developer can develop libraries 852 that are compiled into object code and linked with the object code generated by the assembler 840 during compilation of the executable program 860. The software developer can specify an application programming interface (API) that is utilized within the source code 810 to call functions implemented by the libraries 852. For example, a library could be specified that takes a set of filter coefficients as input and generates a convolution filter object that can be utilized to filter a multi-channel input signal by the convolution filter defined by the set of filter coefficients, where applying the filter is performed by executing a set of floating point operations on a vector processing unit. Such embodiments are different from the software framework described above in that the libraries are compiled into binary object files, and source code for the functions in the libraries are typically not provided to the software developer to modify or extend.

In still other embodiments, such functionality can be built-in to an operating system that provides an execution environment for the executable program 860. For example, applying a convolution filter to an input signal can be a standard operation made available to executable program 860 by the operating system by way of a system call.

It will be appreciated that the code described above is utilized to optimize processing of a convolution operation on a CPU that includes one or more cores having a vector processing unit. This can sometimes avoid the need to offload the convolution operation to a GPU or other type of specialized parallel processor, which may or may not be available within a particular electronic device. Furthermore, this can avoid the need to offload the convolution operation to a remote machine, such as using cloud-based computing resources to process the convolution operation. In the past, the processing speed of the convolution operation was related to the width of the output and how well that width fit the architecture the operation was executed on. In contrast, code optimized in the manner described above, increases the efficiency of the convolution operation to better use the vector processing resources of the architecture, for any arbitrary width of the output. Large increase in processing speed can be realized in this manner.

Figure 9:
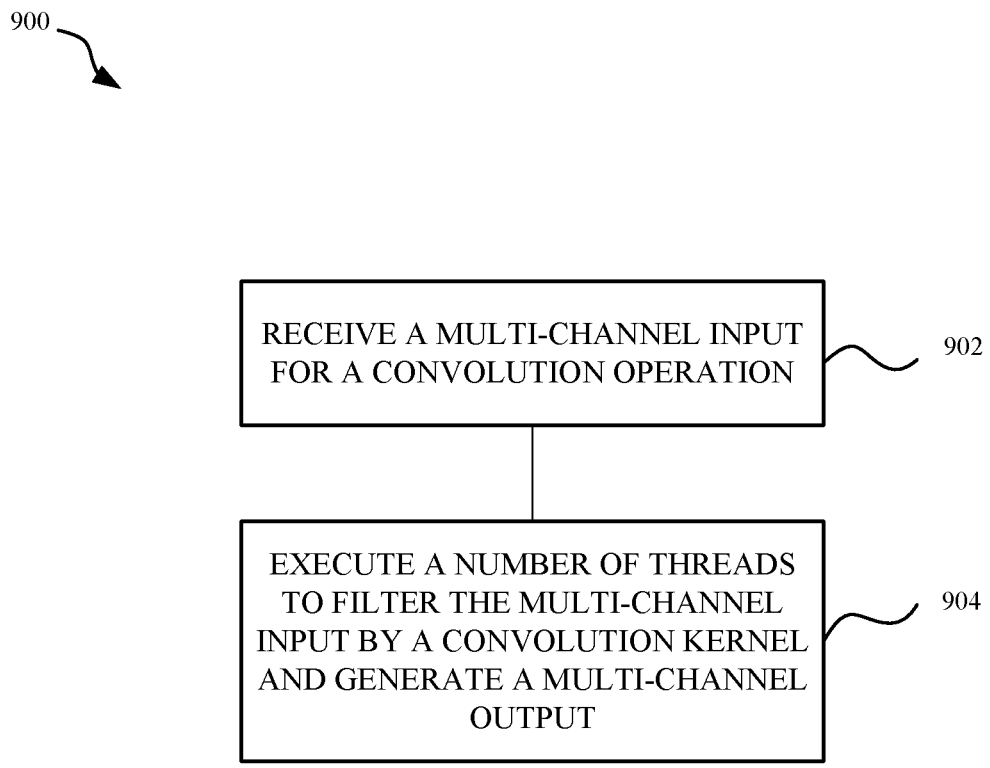
FIG. 9 illustrates a flowchart of a method for optimizing a convolution operation on a vector processor, in accordance with some embodiments.

FIG. 9 illustrates a flowchart of a method 900 for optimizing a convolution operation on a vector processor, in accordance with some embodiments. The method 900 can be performed by software, hardware, or any combination of software or hardware. In some embodiments, the method 900 is implemented by a plurality of instructions executed by the vector processor 200 included in a computing device.

At 902, a computing device including a vector processor receives a multi-channel input for the convolution operation. Each channel of the multi-channel input comprises an array of elements. In some embodiments, each channel of the multi-channel input comprises an image including a two-dimensional array of elements. The convolution operation is associated with a convolution kernel that includes a set of coefficients. The convolution kernel can be a single channel, where the set of coefficients are applied to each of the channels of the multi-channel input, or can be multi-channel, where a different set of coefficients are specified for each channel of the multi-channel input and each channel of the multi-channel output.

At 904, the computing device executes a number of threads to filter the multi-channel input by the convolution kernel to generate a multi-channel output. In some embodiments, the threads are configured to be executed by a processor that includes a vector processing unit of a particular width. Each channel of the multi-channel output has a width that is not equal to an integer multiple of the particular width, and at least one thread in the number of threads is configured to perform an operation on a vector operand that includes one or more elements from two or more channels of the multi-channel input.

In some embodiments, a master thread divides the multi-channel output into a number of blocks and assigns each block to a separate and distinct child thread. Each block includes a set of corresponding windows for a number of channels of the multi-channel output. The child threads determine a width of the block and divides the block into sub-blocks of specified widths that are processed in a specified manner. The child thread, when processing at least one sub-block, is configured to process elements of a row of each channel of the number of channels using different vector instructions for each channel. The vector instructions can include FMA instructions configured for the vector processing unit. The child thread, when processing at least one other sub-block, is configured to process elements of two or more channels of the number of channels using a single vector instruction.

Figure 10:
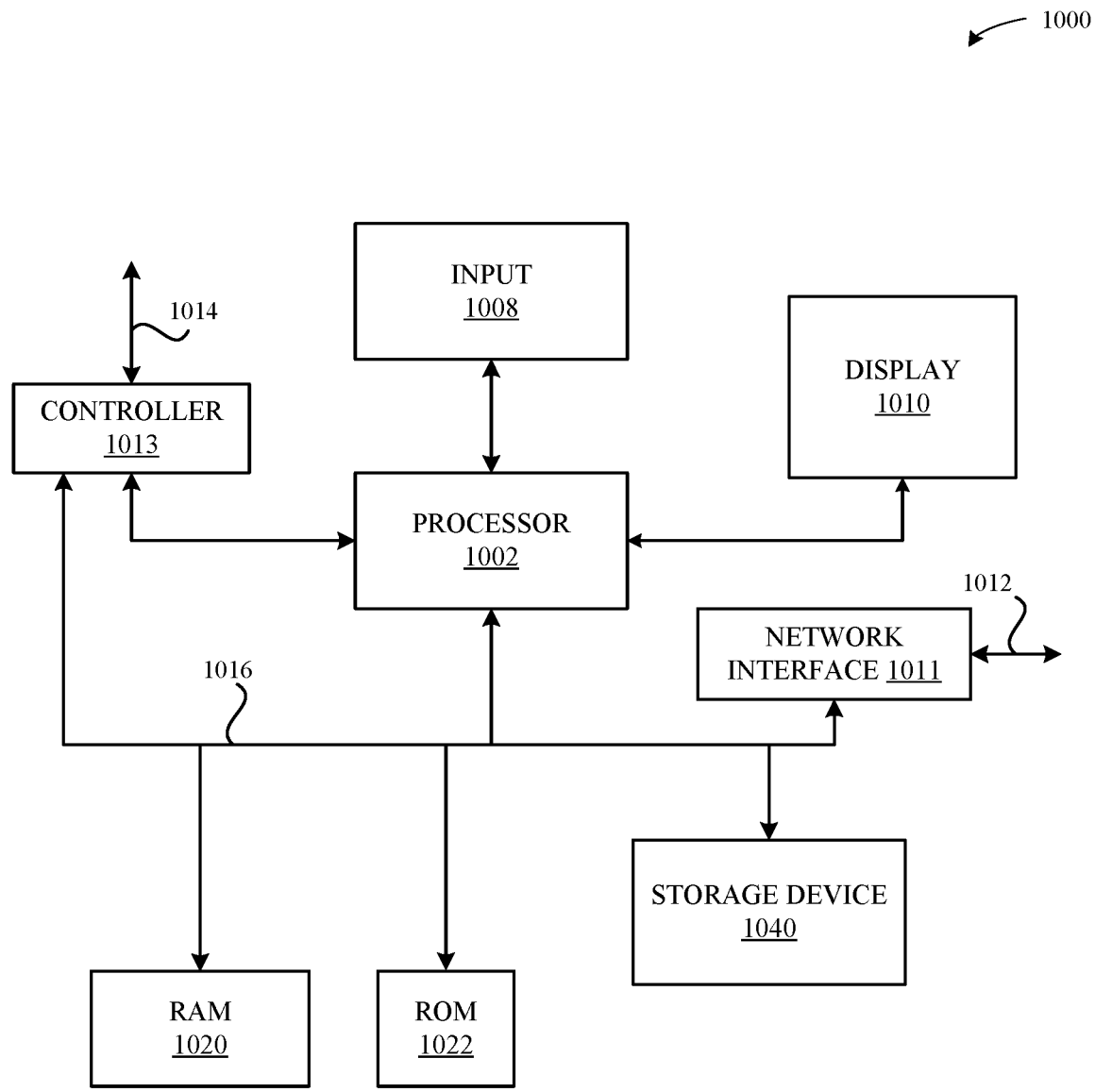
FIG. 10 illustrates a detailed view of an exemplary computing device that can be used to implement the various apparatus and/or methods described herein, in accordance with some embodiments.

FIG. 10 illustrates a detailed view of an exemplary computing device 1000 that can be used to implement the various apparatus and/or methods described herein, in accordance with some embodiments. In particular, the detailed view illustrates various components that can be included in the computing devices described herein.

As shown in FIG. 10, the computing device 1000 includes a processor 1002 that represents a microprocessor or controller for controlling the overall operation of computing device 1000. In some embodiments, the processor 1002 is a vector processor 200. Alternatively, the processor 1002 can communicate with the vector processor 200, generating threads to be executed by the vector processor to execute the convolution operation. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to present visual information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include a wireless transceiver.

In some embodiments, the processor 1002 can be embodied in a variety of forms. For example, the processor 1002 can be embodied as various processing hardware-based means such as a microprocessor, a coprocessor, a controller or various other computing or processing devices including integrated circuits such as, for example, an application specific integrated circuit (ASIC), a field programmable gate array (FPGA), some combination thereof, or the like. Although illustrated as a single processor, it will be appreciated that the processor 1002 can include two or more processors. The processors can be in operative communication with each other and can be collectively configured to perform one or more functionalities of the computing device 1000 as described herein. In some embodiments, the processor 1002 can be configured to execute instructions that can be stored in the RAM 1020 or that can be otherwise accessible to the processor 1002.

The computing device 1000 also include a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random-Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing a convolution operation, the method comprising:
receiving a multi-channel input for the convolution operation, wherein each channel of the multi-channel input comprises an array of elements; and
executing, by a processor that includes a vector processing unit of a particular width, a number of threads to filter the multi-channel input by a convolution kernel that includes a set of coefficients, wherein:
each channel of a multi-channel output generated by the convolution operation has a width that is not equal to an integer multiple of the particular width of the vector processing unit, and
at least one thread in the number of threads is configured to perform an operation on a vector operand that includes one or more elements from two or more channels of the multi-channel input to generate elements for two or more channels of the multi-channel output.

2. The method of claim 1, wherein each channel of the multi-channel output comprises an image that includes a two-dimensional array of elements.

3. The method of claim 2, further comprising:
dividing each image into a number of windows;
defining a block that includes a set of corresponding windows for a number of channels of the multi-channel output; and
assigning the block to a thread configured to be executed by the vector processing unit.

4. The method of claim 3, wherein the thread divides the block into one or more sub-blocks, each sub-block processed, sequentially, by a series of instructions corresponding to a corresponding width and number of channels of the sub-block.

5. The method of claim 4, wherein at least one sub-block is processed by a series of instructions configured to generate elements of only one channel of the multi-channel output in an accumulator in parallel.

6. The method of claim 5, wherein at least one other sub-block is processed by another series of instructions configured to generate elements of two or more channels of the multi-channel output in an accumulator in parallel.

7. The method of claim 1, wherein the processor includes two or more processor cores, and each thread in the number of threads is scheduled to execute on a particular processor core in the two or more processor cores.

8. The method of claim 1, wherein the vector processing unit includes four data paths configured to operate on four single-precision floating-point elements stored in a 128-bit register.

9. The method of claim 1, wherein the vector processing unit includes 16 data paths configured to operate on 16 single-precision floating-point elements stored in a 512-bit register.

10. The method of claim 1, wherein the convolution operation is implemented within a convolution neural network.

11. A non-transitory computer readable medium storing instructions that, when executed by a processor, cause the processor to filter a multi-channel input according to a convolution kernel by performing steps comprising:
 identifying a width of each channel of the multi-channel input;
 generating a number of threads to process the multi-channel input by the convolution kernel,
 wherein at least one thread of the number of threads is configured to perform an operation on a vector operand that includes one or more elements from two or more channels of the multi-channel input when the width of each channel is not equal to an integer multiple of a particular width of a vector processing unit included in the processor and configured to execute the at least one thread.

12. The non-transitory computer readable medium of claim 11, the steps further comprising:
 dividing each channel of a multi-channel output into a number of windows;
 defining a block that includes a set of corresponding windows for a number of channels of the multi-channel output; and
 assigning the block to a thread configured to be executed by the vector processing unit.

13. The non-transitory computer readable medium of claim 12, wherein the thread divides the block into one or more sub-blocks, each sub-block processed, sequentially, by a series of instructions corresponding to a corresponding width and number of channels of the sub-block.

14. The non-transitory computer readable medium of claim 13, wherein at least one sub-block is processed by a series of instructions configured to generate elements of only one channel of the multi-channel output in an accumulator in parallel, and at least one other sub-block is processed by another series of instructions configured to generate elements of two or more channels of the multi-channel output in the accumulator in parallel.

15. The non-transitory computer readable medium of claim 11, wherein the particular width is equal to 16 elements.

16. The non-transitory computer readable medium of claim 11, wherein the instructions are included in a software library associated with the processor.

17. A computing device configured to filter a multi-channel input signal according to a convolution kernel, the computing device comprising:
 a memory storing the multi-channel input signal and a set of filter coefficients associated with the convolution kernel; and
 a vector processor that includes a vector processing unit of a particular width, the vector processor coupled to the memory and configured to:
  execute a number of threads to filter the multi-channel input signal by a convolution kernel that includes a set of coefficients, wherein each channel of the multi-channel input signal comprises an array of elements and each thread in the number of threads is assigned to a block of a multi-channel output signal that includes elements from two or more channels of the multi-channel output signal,
 wherein:
  each channel of the multi-channel output signal has a width that is not equal to an integer multiple of the particular width of the vector processing unit, and
  at least one thread in the number of threads is configured to perform an operation on a vector operand that includes one or more elements from two or more channels of the multi-channel input signal to generate elements for two or more channels of the multi-channel output signal.

18. The computing device of claim 17, the vector processor further configured to:
 divide each channel of the multi-channel output signal into a number of windows;
 define a block that includes a set of corresponding windows for a number of channels of the multi-channel output signal; and
 assign the block to a thread configured to be executed by the vector processing unit.

19. The computing device of claim 18, wherein the thread divides the block into one or more sub-blocks, wherein at least one sub-block is processed by a series of instructions configured to generate elements of only one channel of the multi-channel output signal in an accumulator in parallel, and at least one other sub-block is processed by another series of instructions configured to generate elements of two or more channels of the multi-channel output signal in the accumulator in parallel.

20. The computing device of claim 17, wherein the processor includes two or more processor cores, and wherein the vector processing unit includes 16 data paths configured to operate on 16 single-precision floating-point elements stored in a 512-bit register.

\* \* \* \* \*